L. COLLINGE.
GAS SAVER FOR INTERNAL COMBUSTION ENGINES.
APPLICATION FILED JAN. 21, 1918.
1,329,753.
Patented Feb. 3, 1920.
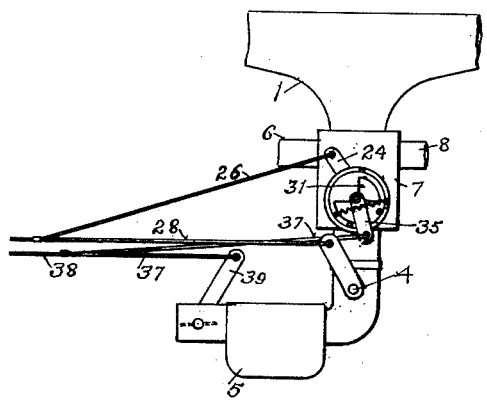
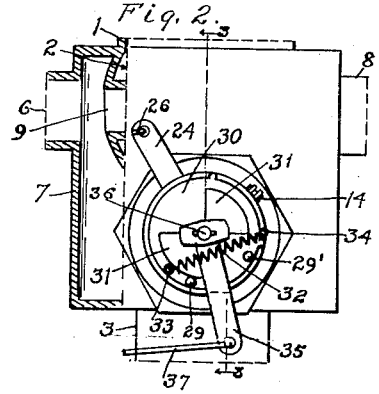
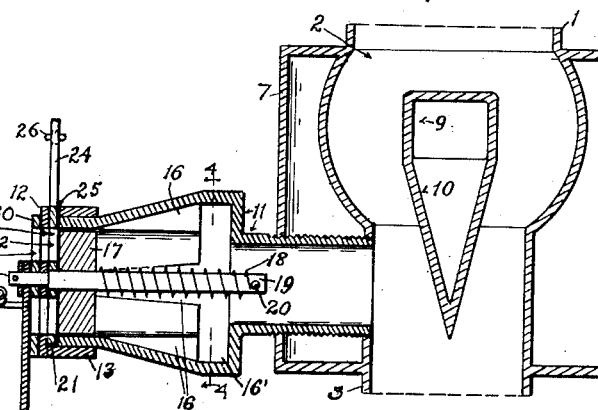
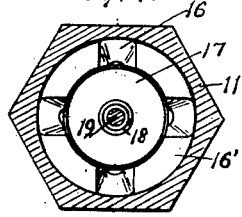
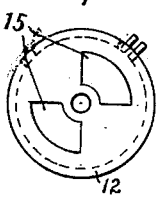
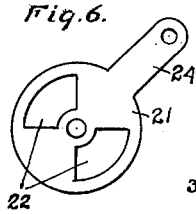
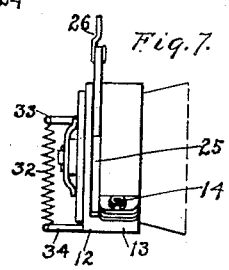
INVENTOR
Lee Collinge
BY
Arthur P. Knight
ATTORNEY

UNITED STATES PATENT OFFICE.

LEE COLLINGE, OF PORTLAND, OREGON.

GAS-SAVER FOR INTERNAL-COMBUSTION ENGINES.

1,329,753.  Specification of Letters Patent.  Patented Feb. 3, 1920.

Application filed January 21, 1918. Serial No. 212,872.

*To all whom it may concern:*

Be it known that I, LEE COLLINGE, a citizen of the United States, residing at Portland, in the county of Multnomah and State of Oregon, have invented a new and useful Gas-Saver for Internal-Combustion Engines, of which the following is a specification.

This invention relates to means for controlling auxiliary air supply to the intake or carbureter connections of internal combustion engines, particularly for motor vehicle engines so as to decrease the gas or fuel consumption by the engine, and enable it to operate satisfactorily under different conditions of operation.

The main object of the present invention is to provide an improved means for this purpose which will enable the requisite amount of auxiliary air to be supplied when the engine is running at high speed, and also enable the auxiliary air to be reduced as required when the engine is starting, or under heavy load.

The accompanying drawing illustrates an embodiment of my invention, and referring thereto:

Figure 1 is a side elevation of the auxiliary air supply means in connection with the intake or manifold of the internal combustion engine.

Fig. 2 is a partly broken elevation of the auxiliary air valve.

Fig. 3 is a section on line 3—3 in Fig. 2.

Fig. 4 is a section on line 4—4 in Fig. 3.

Fig. 5 is an elevation of the valve cap.

Fig. 6 is an elevation of the throttle controlled valve.

Fig. 7 is a plan view of the valve device.

My auxiliary air supply device is preferably applied in connection with means for heating the mixture by the heat of the exhaust, and is so illustrated in the drawing. It will be understood, however, that its use is not limited to such connection and that it may be applied without heating means. The manifold or intake pipe 1 of the engine is connected to a heating chamber 2, to which a pipe 3 leads from the throttle 4, and the carbureter 5 is connected to the pipe containing said throttle. A pipe 6 leads from the exhaust of the engine to a casing 7 surrounding the heating chamber 2, and a pipe 8 carries the exhaust gases away from said casing. A passage 9 may be provided through chamber 2, and communicating with casing 7, said passage having a downwardly projecting conical extension 10 so as to present more heating surface to the mixture passing through chamber 2.

At one side of casing 7 and chamber 2 is provided a tubular air inlet member 11, opening at its inner end into the chamber 2 and having at its outer end a cap 12, secured thereto in any suitable manner, for example, by a split ring flange 13, fastened by screw 14, said cap having ports 15 formed therein. The tubular member 11 is provided in its inner surface with a plurality of longitudinal grooves or channels 16, which are of relatively small cross section at the outer ends and increase in cross section toward the inner end of the tubular member and open at their inner ends into an annular groove 16'. A slide valve 17 formed as a disk, slides within the tubular member 11 and on a rod 19 extending axially therein to close or open communication through said grooves. Rod 19 is fixed on cap 12 and a spring 18 extends between valve 17 and a pin 20 on said rod, so as to tend to hold said valve closed.

A manually operated valve (that is to say, a valve operated by the operator of the engine, whether by hand or foot operated means) is provided for controlling passage of air through ports 15 in cap 12, said valve comprising a disk 21 mounted to turn on rod 19 and within the tubular member 11 and provided with ports 22 coöperating with the ports 15, said valve disk 21 having an arm 24 extending through a lateral slot 25 in the flange of cap 12, and being connected to a rod or wire 26 which is connected to the operating or controlling rod 28 for the throttle 4, in such manner as to cause the ports 15 to be opened in correspondence with the opening of the throttle. Valve disk 21 extends between the cap 12 and the outer end of tubular member 1, so as to be thereby retained in position.

I also prefer to provide additional controlling means for the auxiliary air, operating under the control of the means for enriching the mixture, when such means are used. For this purpose, a valve disk 30 may be mounted to turn on a central stud 36 on the outer side of the fixed cap 12, said valve disk having ports 31 and provided with an operating spring 32 connected thereto by pin 33, and connected at its other end to a stud 34 on the cap 12. An arm 35, pivoted on the central stud 36, is connected by a rod 37 to the rod 38 which is connected to the enriching device 39, the latter being of any well known construction and adapted to control the supply of air to the carbureter so as to temporarily increase the richness of the mixture. Said arm 35 engages with studs 29 and 29' on valve disk 30 to turn said valve in either direction. The spring 32 is so arranged that in the movement of said valve by the arm 35 it passes over the dead center with respect to its pivot at 36, so as to cause the valve to be closed as soon as the enricher is moved to enriching position.

In the operation of the device above described, the valve member 21 is opened when the throttle 4 is opened, for starting the engine. This admits air through ports 15, and the suction of the engine draws slide valve 17 inwardly so as to allow auxiliary air to enter, the throttle being only partly open at this time, and valve 21 being also only partly open, and valve 17 open sufficiently to admit only the proper amount of air for starting, a comparatively rich mixture being then required. When the vehicle is under way, the throttle is moved back part way toward closed position, decreasing the suction on the carbureter and increasing the suction on the auxiliary air valve, causing valve 17 to move farther and bringing wider portions of ports 16, into operation to admit more auxiliary air and give a leaner mixture. Assuming now that the power is to be thrown off for any reason, the throttle is closed and valve 21 is closed by the same action (through connection 26) and the engine is enabled to run "idle"—not being "killed" by undue dilution of the mixture; the spring for the automatic valve 17 not being depended on for shutting off auxiliary air. Under this condition, (which is accompanied by strong suction) it may be made relatively light, increasing its sensitiveness and ability to respond properly for admission of more air at high speeds. The annular channel 16' permits free passage of the air when the automatic valve 17 is fully open. In case the enricher is used, it will normally be open when the engine is in operation, and the valve 30 connected thereto will be wide open and will not affect the operation above described. But if the enricher be partly closed, as in starting the engine, to increase the suction on the carbureter, the connection 37 will operate the arm 35 so as to cause it to engage stud 29 on valve 30 and a slight movement of said valve will cause spring 32 to pass dead center and throw the valve to fully closed position, so as to enable full enrichment of the mixture, as controlled by the enricher. On return movement of the enricher, the reverse operation takes place, the valve 30 being pushed back by arm engagement of 35 with stud 29' until spring 32 passes dead center and throws the valve to full open position.

What I claim is:

1. In an auxiliary air control means for carbureters, a tubular air inlet member provided with longitudinal channels, a cap at the outer end of said member provided with ports and with a lateral slot, a rod extending from said cap within said tubular air inlet member, a valve disk mounted to turn on said rod and extending between said cap and the outer end of the tubular air inlet member, and provided with ports for coöperation with the ports in the cap, and with an operating arm extending through said slot, a valve mounted to slide on said rod within said tubular member to control passage of air through said longitudinal channels and spring means for controlling the inward movement of said last named valve.

2. In combination with intake means for an internal combustion engine, provided with a throttle and with a carbureter having mixture enriching control means, an auxiliary air inlet, three valves controlling passage of air through said inlet, one of said valves being connected for operation in correspondence with said throttle, another of said valves being connected for operation so as to be closed when the enriching means is closed, and the other of said valves being spring operated so as to open automatically under the suction from the engine.

3. In an auxiliary air control means as set forth in claim 2 and in addition spring means controlling the valve connected to said mixture enriching control means, said spring means passing over dead center in the operation thereof, so as to move the air valve to closed position upon the small initial movement of the mixture enriching control means toward closed position.

In testimony whereof I have hereunto subscribed my name this 12th day of January, 1918.

LEE COLLINGE.